Nov. 30, 1954  T. IAVELLI  2,695,696
TRANSMISSION CLUTCH CONTROL MECHANISM
Filed Feb. 6, 1950  4 Sheets-Sheet 1

INVENTOR.
Teno Iavelli.
BY
Harness and Harris
ATTORNEYS

INVENTOR.
Teno Iavelli.
BY
Harness and Harris
ATTORNEYS

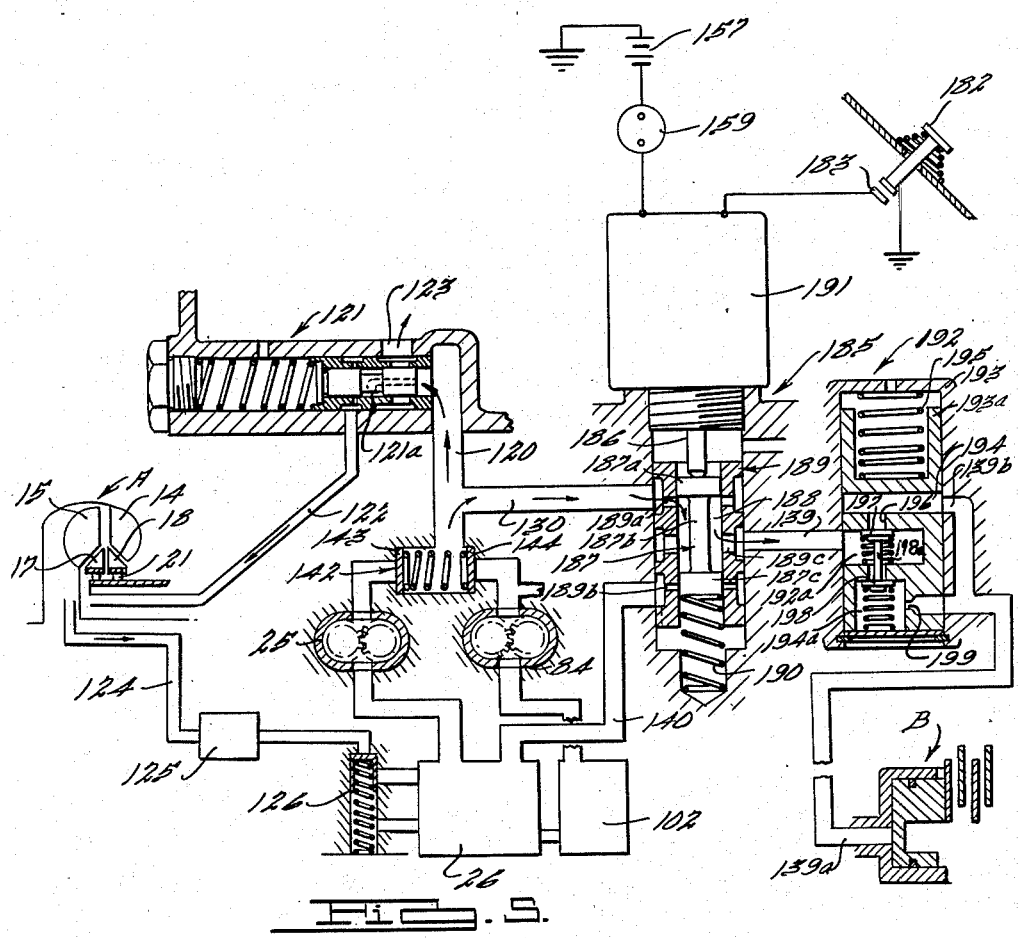

United States Patent Office 2,695,696
Patented Nov. 30, 1954

2,695,696

TRANSMISSION CLUTCH CONTROL MECHANISM

Teno Iavelli, Detroit, Mich., assignor to Chrysler Corporation, Highland Park, Mich., a corporation of Delaware Application February 6, 1950, Serial No. 142,599

12 Claims. (Cl. 192—85)

This invention relates to a power transmission unit including a fluid power transmitting device, a hydraulically actuated master clutch, and a change speed gear box arranged in series relationship for the transmission of drive. More particularly this invention pertains to the hydraulically actuated master clutch of this drive train and to the control system associated therewith.

It is a primary object of this invention to provide a hydraulically or pressure fluid operated clutch that is easily operated and arranged to provide a feathered or cushioned clutch engaging action as well as a quick release of the clutch connected elements.

It is another object of this invention to provide a clutch construction of high capacity, easy operability, and simplified design that is characterized by feathered or cushioned engaging action and quick releasability.

Other objects and advantages of this invention will become apparent from a reading of the description below and a consideration of the related drawings wherein:

Fig. 1a is a diagrammatic plan view of the power transmission unit embodying this invention applied to a motor vehicle drive train;

Fig. 5 is another diagrammatic view of a modified form of master clutch control system with certain parts thereof shown in sectional elevation.

Fig. 1a diagrammatically discloses a conventional motor vehicle power plant and drive train comprising an internal combustion type of engine E drivingly connected to a hydrokinetic type of torque converter unit A of the power transmission unit that also includes the master clutch unit B and the change speed gear box C. The output from gear box C drives a propeller or drive shaft 6 that transmits drive to the rear wheels of the vehicle through the rear driving axles 7. The clutch unit B is adapted to be controlled by the manual or driver operation of the clutch pedal 72 as will be more fully explained in the subsequent description. Manual operation of the clutch B is considered to include either hand or foot operation.

Figure 1:
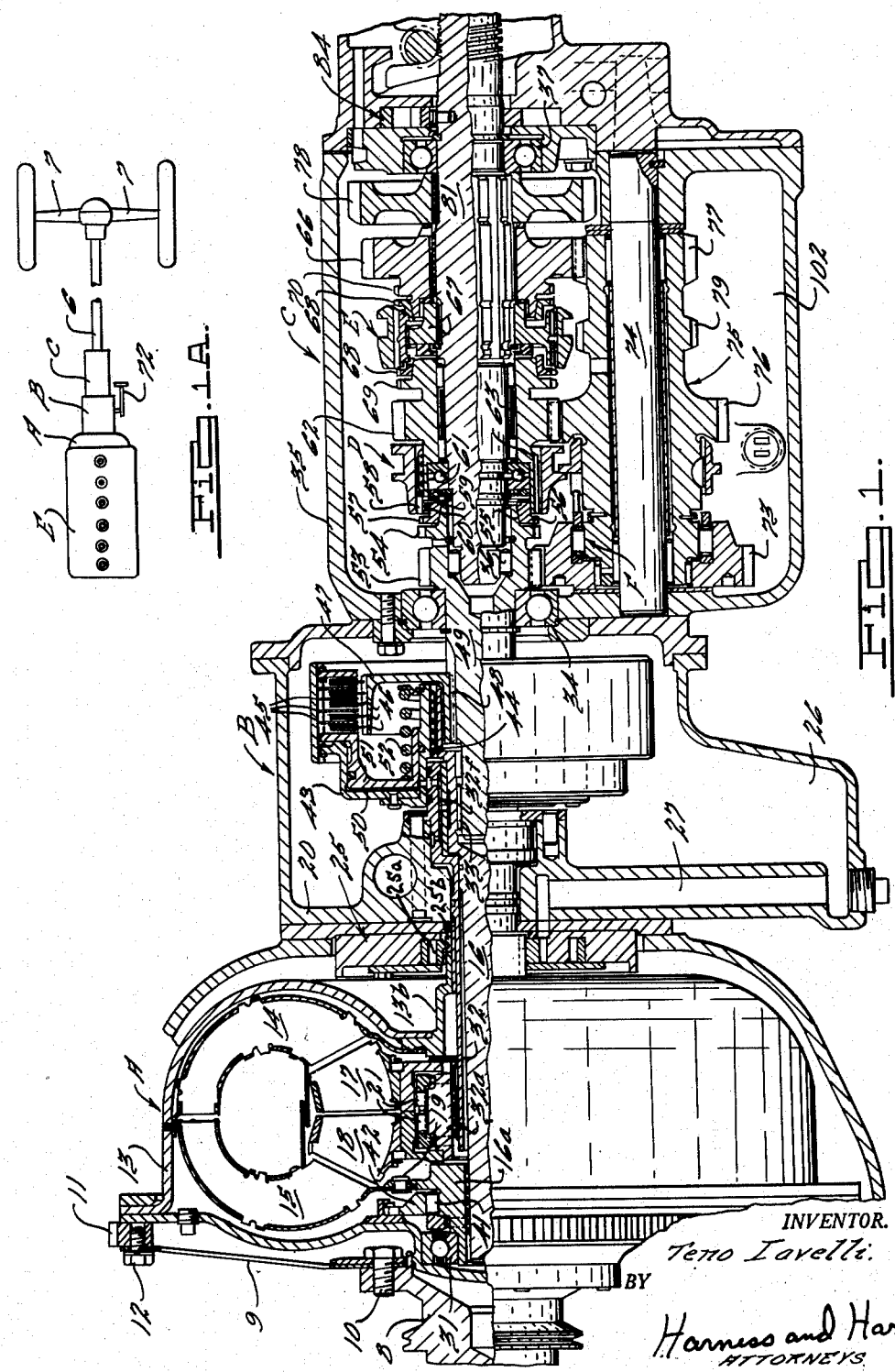
Fig. 1 is a sectional elevational view of a power transmission unit embodying this invention, the power transmission unit including a hydrokinetic torque converter, a hydraulically operated multiple disc clutch and a semiautomatic type of change speed transmission gear box arranged in series relationship.

Fig. 1 of the drawings discloses a power transmission unit comprising a hydrokinetic torque converter unit A, a master clutch unit B, and a change speed gear C arranged in series drive transmitting relationship. Converter unit A is adapted to drivingly connect a prime mover such as the motor vehicle engine E to the driving member of the master clutch unit B while the driven member of clutch unit B is drivingly connected to the input shaft of transmission gear box C. The reference numeral 8 represents an end portion of a driving member, such as the engine crankshaft of the motor vehicle power unit. The shaft 8 is drivingly connected to the axially flexible drive transmitting plate 9 by the screw means 10. The drive transmitting plate 9 has an engine starter ring gear 11 mounted on its periphery by the bolt means 12. Also drivingly connected to the drive plate 9 is the torque converter casing 13 within which are mounted the various converter components, namely, the impeller member 14, the turbine or runner member 15, and the primary and secondary guide wheels or reaction members 17 and 18 respectively.

The vaned impeller wheel 14 is fixedly connected to the converter casing 13 and is accordingly adapted to be rotatably driven by the driving shaft 8. The vaned turbine wheel 15 is drivingly connected by rivet means 19 to a radially extending flange portion formed on the hub member 16a of the converter driven shaft 16. Hub member 16a is connected by splines or the like to the forward end portion of the driven intermediate shaft member 16.

The intermediate shaft member 16 is adapted to transmit drive from the torque converter unit A to the clutch unit B arranged rearwardly of and in series with the torque converter unit A. The forward end of intermediate shaft 16 is piloted in a bearing assembly 31 mounted in the converter casing 13. The rear end portion of intermediate shaft 16 is rotatably supported by the casing 20 of the clutch unit B.

The vaned guide wheels 17 and 18 of the converter are rotatably supported within the converter casing 13 by means of the one-way brake devices 21. The one-way brake devices 21 are mounted on an axially extending sleeve 32 that is fixed to and projects from the rearwardly positioned, relatively stationary, clutch housing 20. Sleeve 32 has a hub member 32a splined thereto which hub member supports the overrunning or one-way brake devices 21. The one-way brakes 21 are designed and arranged such that they will permit only forward rotary movement (clockwise when looking from the converter A towards clutch B of Fig. 1) to be transmitted to guide wheels 17 and 18 by the forward or clockwise rotation of the impeller 14. The brakes 21 lock against the sleeve 32 to prevent rotation of the guide wheels 17 and 18 in a reverse or counterclockwise direction.

An overrunning or one-way clutch device 41 may be mounted between the hub portion 16a of driven intermediate shaft 16 and the encircling annular ring 42 that is fixedly mounted to the inner wall of the converter casing 13. This one-way clutch device 41 is similar to the one-way brakes 21 but reversely arranged so as to prevent the speed of the driving shaft 8 from dropping below the speed of the driven shaft 16. Such an arrangement is quite advantageous due to the fact that it provides a means for obtaining improved engine braking in an engine driven power transmitting drive train that includes a slip-drive power transmitting device such as the converter A. The clutch device 41 has particular importance in motor vehicle drive for not only does it provide a means for obtaining engine braking on coast drive, but it also provides a means for automatically locking the intermediate driven shaft 16 to the driving shaft 8 to facilitate starting of the engine unit E by towing or the like.

The torque converter unit A includes a gear type oil pump 25 having a driven gear 25a that is directly connected by pin and slot means 25b to the axially extending flange portion 13b of the rotatable converter casing 13. The pump 25 draws oil from a sump 26 through the conduit 27 and circulates it through the converter unit A, portions of the transmission lubricating system, and the various hydraulically operated control mechanisms associated with this transmission unit and hereinafter more fully described (see Figs. 4 and 5). The circulation of oil through the converter A, by the pump 25, provides a means for maintaining the converter full of oil whenever shaft 8 is rotating. A second oil pump 84 driven by the transmission output shaft 81 is also included in this power transmission unit to provide a source of pressure fluid when the engine E is not operating. The pump 84 and its operation will be hereinafter more fully described.

The master clutch B arranged between converter A and gear box C includes the drum-like annular member 43 which is splined at 44 to the intermediate driven shaft 16. Driven shaft 16 constitutes the driving member of clutch B. Mounted on the peripheral portion of the annular member 43 are friction clutch elements 45. Clutch elements 45 are adapted to be engaged with cooperating clutch elements 46 carried by the drum-shaped member 47. Drum-shaped member 47 is drivingly connected at 48 to the input shaft 49 of the change speed gear box C. Shaft 49 constitutes the driven member of clutch B. Engagement of clutch discs 45 and 46 is effected by the admission of pressure fluid to the cylinder bore 50 in the annular member 43. Pressure fluid admitted to cylinder bore 50 moves the reciprocably mounted piston 51 rearwardly to cause engagement of clutch discs 45 and 46. Compression spring 52 normally urges piston 51 towards a forward, disengaged clutch position. Passage 32f in sleeve 32 provides a means for supplying pressure fluid to the cylinder bore 50. The shaft 49 which transmits drive from clutch B to gear box C has its forward end piloted in the driven shaft 16 as shown at 33 and its rear portion is supported by the bearing assembly 34 carried by the housing 35 for the gear box C.

The illustrated change speed transmission gear box C is of the underdrive type although other types including overdrive transmissions of known commercial form may be employed if desired. This transmission unit C includes the input shaft 49 which carries the input pinion 53, the clutch teeth 54 and a friction cone 55. The cone 55 has rotatably mounted thereon the synchronizing blocker ring 56 which is formed with blocker teeth 57 adapted to be engaged by the teeth 58 of an axially shiftable clutch sleeve D. Sleeve D is adapted to be drivingly connected to the output shaft 81. Shaft 81 has its forward end rotatably mounted in the rear end of input shaft 49 by means of bearing assembly 36 and the rear portion of output shaft 81 is supported by the bearing assembly 37 carried by the gear box housing 35. This sleeve D and input shaft 49 comprise relatively rotatable members each of which is provided with engageable, toothed, drive control elements 58, 54 respectively for effecting step-up and step-down variation in the speed ratio drive transmitted by the transmission unit C.

Gear 62 is rotatably mounted on the output shaft 81 whereas pinion 53 is preferably an integral part of the input shaft 49. Also rotatably mounted on the output shaft 81 is a low speed gear 66. A manually operable, axially shiftable, internally toothed, sleeve type clutch E, which has a splined connection with a hub 67 fixed to shaft 81, is adapted to drivingly connect the gears 62 and 66 to the output shaft 81. The clutch sleeve E has associated therewith a pair of toothed blocker synchronizers 68 similar to blocker ring 56 such that clutch E may be shifted either forwardly to high range or rearwardly to low range to synchronously clutch output shaft 81 either with the high speed gear 62 through the teeth 69 or with the low speed gear 66 through the teeth 70. Manual shifts of clutch E are facilitated by release of the master clutch B through operation of the usual clutch pedal 72 (see Fig. 4) or some other manual control such as the switch shown in Fig. 5.

Pinion 53 has constant mesh with a gear 73 that is rotatably supported by the countershaft 74. Countershaft gear 73 is drivingly connected through an overrunning clutch F to the countershaft cluster 75. Clutch F permits gear cluster 75 to overrun gear 73 in a forward direction. The gear cluster 75 comprises gears 76 and 77 respectively in constant mesh with gears 62 and 66. For reverse an axially shiftable idler gear (not shown) having constant mesh with gear 77 is shifted rearwardly to mesh with the reverse gear 78 that is fixed on output shaft 81. Clutch E is maintained in its illustrated neutral condition when reverse drive is transmitted from shaft 49 to shaft 81. A reverse drive is thereby transmittable from shaft 49 through gears 53, 73, clutch F, gear 77, the idler gear (not shown) and gear 78 to the output shaft 81.

Blocker ring 56 is lightly urged against the cone 55 by an annular washer type spring 59 that extends between the forward end 61 of gear 62 and the blocker ring 56. Ring 56 has a lost-motion lug and slot connection at 60 with the slotted forward end of the hub 61 of the high speed gear 62 such that the blocker ring 56 may rotatably move relative to sleeve D between two positions blocking the forward shift of sleeve D. Such positions are known as the drive block and the coast block positions of the ring 56 depending on whether pinion 53 appreciably leads or lags the speed of the sleeve D. The sleeve D is splined on the gear hub 61 at 63. The arrangement of the blocker ring 56 relative to the pinion teeth 54 and sleeve teeth 58 is such that whenever sleeve D is rotating faster or slower than pinion 53 then the blocker ring teeth 57 will be aligned with the ends of the teeth 58 of sleeve D and thus prevent forward shift of the sleeve teeth 58 into contact with drive pinion teeth 54. However, when the pinion 53 is rotating faster than sleeve D and gear 62 and the sleeve D is biased forwardly into the so-called drive blocked position, the driver may release the engine accelerator pedal or apply some other control element so as to cause the engine and pinion 53 to slow down and as the pinion 53 and sleeve D pass through a synchronous speed relationship the blocker ring 56 is moved from its drive blocking position toward its coast blocking position and when substantially mid-way therebetween will unblock the sleeve teeth 58 and allow teeth 58 to pass between the blocker teeth 57 and clutch with pinion teeth 54.

When clutch E is shifted rearwardly to clutch gear 66 to shaft 81 then an overrunning relatively slow speed low range drive or first speed is transmitted from shaft 49 to shaft 81 by way of gears 53, 73, overrunning clutch F, and gears 77 and 66. If at such time sleeve D is biased forwardly into drive block position and the shaft 49 allowed to coast down by overrunning release of clutch F, then when the speed of pinion teeth 54 is synchronized with the speed of teeth 58 of sleeve D the latter, as aforesaid, will be unblocked and will clutch with pinion teeth 54 to effect a step-up in the transmission during coasting conditions so that now a two-way relatively fast speed low range drive or second speed is effected from shaft 49 through sleeve D to gear 62 thence by way of gears 76, 77, and 68 and engaged clutch E to the output shaft 81, the clutch F overrunning during this drive.

If clutch E is shifted forwardly to clutch gear 62 to shaft 81 then an overrunning relatively slow speed high range drive or third speed is transmitted from shaft 49 to shaft 81 by way of gears 53, 73 overrunning clutch F, gears 76 and 62 thence through engaged clutch E to output shaft 81.

In the same manner as aforesaid in connection with step-up from first to second speed, sleeve D may be clutched to input shaft 49 under coast synchronous speed conditions with pinion teeth 54 engaging sleeve teeth 58 to effect a two-way high range or direct fourth speed of a speed ratio of 1 to 1 from shaft 49 directly through sleeve D and engaged clutch E to shaft 81, clutch F overrunning during this drive.

A gear pump 84 drivingly connected to the output shaft 81 is provided to supply pressure fluid to the power transmission unit when the engine is not operating and the output shaft is rotating such as during a towed or pushed start.

Speed responsive governor means O, that may be driven from the countershaft cluster gear 79, is provided as one means to automatically control forward bias of sleeve D as well as rearward bias thereof as will presently be more apparent. Furthermore, during drive in either second or fourth, a downshift or step-down to first or third respectively may be manually effected by rearward bias of sleeve D under control of the driver. This downshift may be accomplished by a full depression of the engine accelerator pedal (not shown) so as to operate a kickdown switch P which is also subsequently described.

Figure 2:
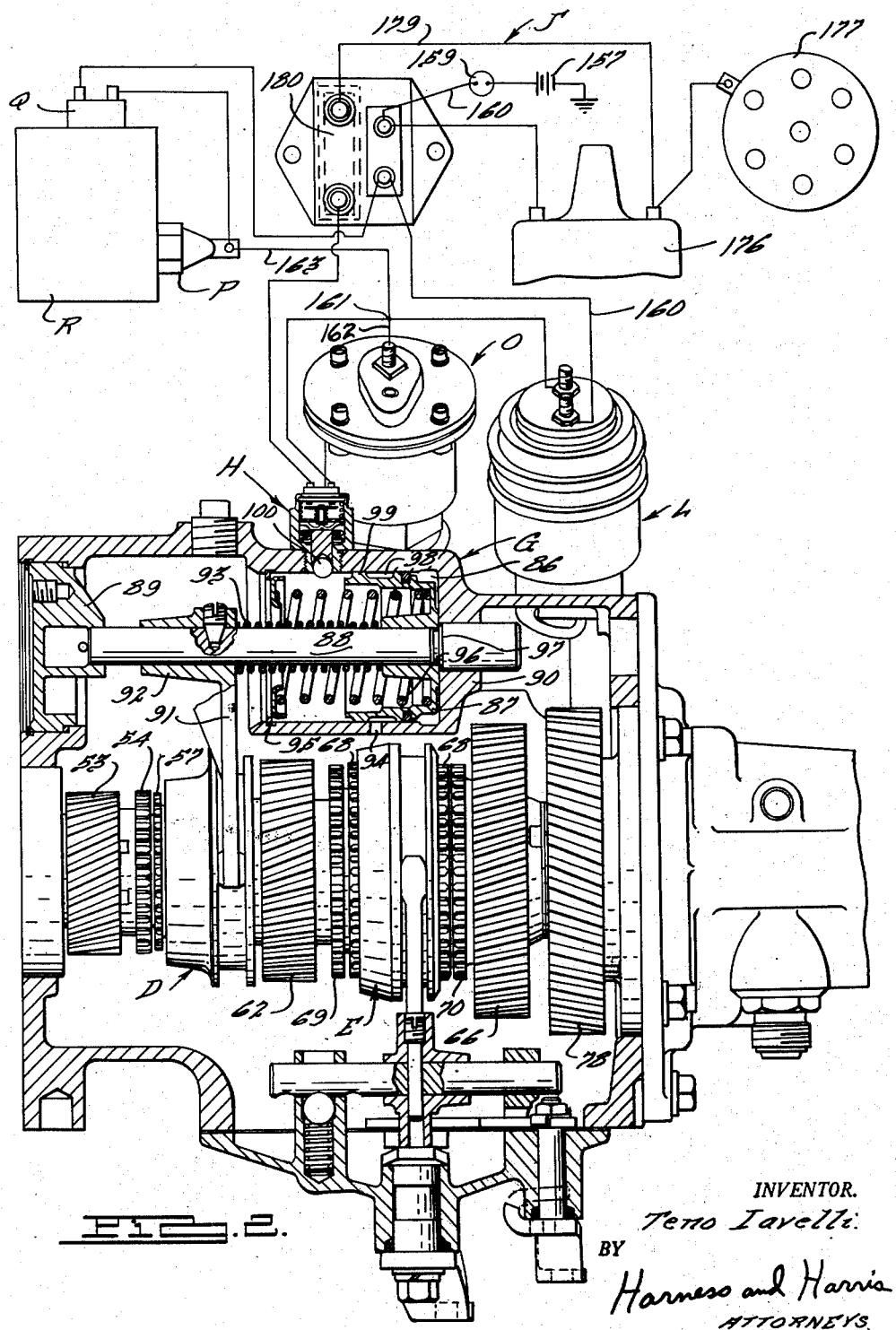
Fig. 2 is a sectional elevational view of the change speed gear box associated with this power transmission unit, the transmission having portions of the electrical controls for the transmission and engine applied thereto.

Referring now to Fig. 2, I have illustrated servo-motor means in the form of a fluid motor or shift cylinder G for controlling shift of sleeve D, this motor comprising a cylinder 86 slidably receiving a piston 87 which slidably receives a rod 88 which is mounted to reciprocate in the guideways 89, 90. Fixed to this rod 88 is the collar 92 of a yoke 91 that is connected with sleeve D to effect shift thereof. A relatively small force pre-loaded engaging spring 93 is threaded on rod 88 and is disposed between piston 87 and yoke 91 to provide a lost-motion thrust transmitting connection such that piston 87 may move forwardly or to the left for its power stroke, being limited by relief ports 94 and abutment 95 in advance of the full clutching shift of sleeve D. On movement of piston 87 to the left the engaging spring 93 is compressed and this compressed spring then urges the yoke collar 92 towards the left so that the teeth 58 of sleeve D are moved into engagement with teeth 57 of blocker 56 and, after coast, with teeth 54 of pinion 53. The yoke collar 92 abuts against the exposed end of guideway 89 when the sleeve D has come to rest in its fully engaged upshifted position. A relatively large force, pre-loaded kickdown spring 96 is disposed between abutment 95 and piston 87 and serves to normally return the piston 87 and sleeve D to the downshifted Fig. 2 position. The spring 96 is thus adapted to effect disengaging bias of sleeve D relative to pinion teeth 54.

Rod 88 has a shoulder 97 which is adapted to engage the head of piston 87 when the piston 87 is in its downshifted position but which, when the piston 87 and rod 88 are moved to the left to the end of their forward, upshifted strokes, is spaced rearwardly of the piston head to provide a gap equal to the difference in the strokes of the piston and rod. This gap is utilized to close an ignition control switch H that is provided for interrupting the engine ignition system J. Piston 87 is formed with an annular groove 98 in its skirt portion to define the cam portion 99 which operates the ball actuator 100 for closing the contacts of the ignition interruption switch H.

The pressure fluid supply system for operation of the servo motor G comprises a suitable supply of oil which is usually at the transmission sump 102. The pump 84 which is driven by the transmission output shaft 81, draws the oil from the supply sump 102 for delivery under pressure to the cylinder 86 of servo motor shift cylinder G. An electrically operated control valve V (see Fig. 4) controls the passage of oil to the shift cylinder G. This valve is operated by the solenoid L. When the valve is seated so as to cause oil to be forced directly from the pump 84 into shift cylinder G, the pressurized oil in cylinder G moves the piston 87 and shift rod 88 to the left (Figs. 1 and 2) thus causing yoke 91 to shift sleeve D to the left and thereby condition the transmission C for the up-shift or step-up to second or fourth speed depending on whether clutch E is engaged with first speed gear 66 or third speed gear 62. When the solenoid L causes the control valve V (see Fig. 4) to be unseated then the pressure fluid being supplied the motor G is by-passed through a pressure fluid relief conduit and the supply of pressurized oil to the shift cylinder G is prevented so that the piston return spring 96 (Fig. 2) tends to drive the rod 88 and shift yoke 91 towards the right to the downshifted position shown in Fig. 2. The control circuit for energization of the solenoid L is such that the solenoid L is energized only in first and third speeds and consequently in second and fourth speeds, where most of the actual driving time is accumulated, the solenoid L is in a de-energized condition. This arrangement increases the life of the solenoid L and accordingly renders the system more economical than one where the solenoid L remains energized during the majority of the driving time.

Figure 3:
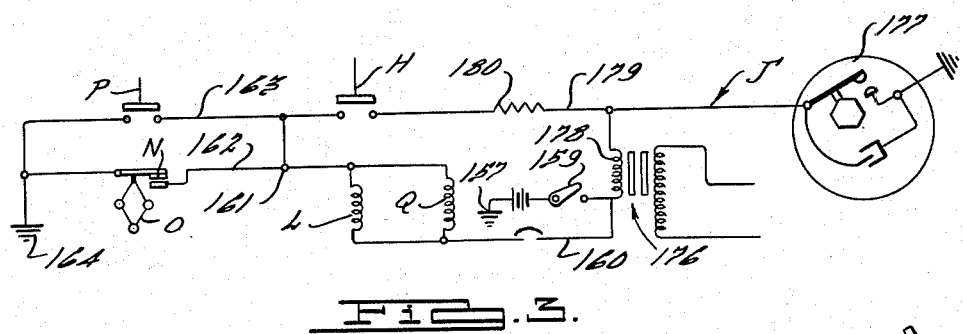
Fig. 3 is a schematic wiring diagram for the electrical controls associated with transmission gear box.

Energization and de-energization of solenoid L is brought about by operation from one position to another of either of two control members N and P which are respectively actuated or controlled by vehicle speed and by the driver. Electrical control circuit means for this purpose (see Figs. 2 and 3) includes a grounded storage battery 157 for supply of electrical energy through an ignition switch 159 to a conductor 160 thence through the solenoid L to a terminal 161, whence either of two parallel conductors 162 or 163 will complete a circuit to ground at 164. A solenoid Q in parallel with the solenoid L controls an anti-stall mechanism associated with the carburetor R of the engine unit that drives the transmission unit C. The governor operated switch N constitutes one of the two aforesaid control members for solenoid L. Switch N is closed at low vehicle speeds and is automatically opened at predetermined vehicle speeds under control of the governor O. When governor operated switch N is closed the solenoid L is energized and shift cylinder G is in its downshifted condition as shown in Fig. 2.

The other parallel circuit for energizing solenoid L, by grounding terminal 161 at 164 through conductor 163, is controlled by the manually operated kickdown switch P. Kickdown switch P is closed by a full depression of the engine accelerator control pedal (not shown). The accelerator pedal thus constitutes the second of the two aforementioned control members for the solenoid L.

The engine ignition system J associated with this transmission is conventional and includes ignition coil 176, and distributor 177. From the primary side 178 of the coil 176 an ignition interruption grounding line 179 extends through a resistance 180 to the ignition interrupter switch H and thence to ground at 164 through conductor 163 and kickdown switch P. It will thus be seen that ignition interruption can only occur when the circuit through the ignition interrupter switch H is closed.

The functioning of this transmission gear box C and its several controls is more specifically set forth in the copending application of Louis B. Forman, Serial No. 747,377, filed May 12, 1947, now Patent No. 2,513,791, dated July 4, 1950. The hereinabove description is considered adequate for an understanding of this invention due to the fact that this invention does not alter the manner of operation of gear box C or the controls therefore.

When a torque converter such as the unit A is substituted for a conventional fluid coupling in a power transmission drive train of the type herein disclosed, then certain problems arise which are either non-existent or inconsequential in a fluid coupling transmitted power transmission unit. It is obvious that a torque converter with a 2 or 3 to 1 torque multiplication factor will require a considerably larger and more powerful master clutch to satisfactorily transmit the drive from the converter unit A to the gear box C than the clutch unit that would be required to transmit the substantially 1 to 1 torque ratio of a fluid coupling. If a conventional dry clutch of the required capacity is used with a torque converter unit in a drive train of the type herein disclosed, it is found that the size of the clutch unit becomes so large that it is objectionable and the pedal pressures required to operate such a clutch are considerably above the accepted maximum values for easy operation of the clutch. To overcome the above-mentioned difficulties, it has been proposed to substitute a hydraulically operated, manually controlled, disc type of master clutch for the conventional dry friction clutch. While hydraulically operated disc type clutches of the type herein disclosed are of suitable size and are adequate for the transmission of the increased torque of the torque converter, still, such clutches may be hard to operate and control manually so as to insure smooth, feathered or cushioned clutch engagements and fast disengagements. The control structure shown in Figs. 4 and 5 of the drawings disclose means whereby a manually controlled relatively small size, easily and smoothly operable multiple disc clutch mechanism may be associated with a power transmission unit such as that herein disclosed.

Figure 4:
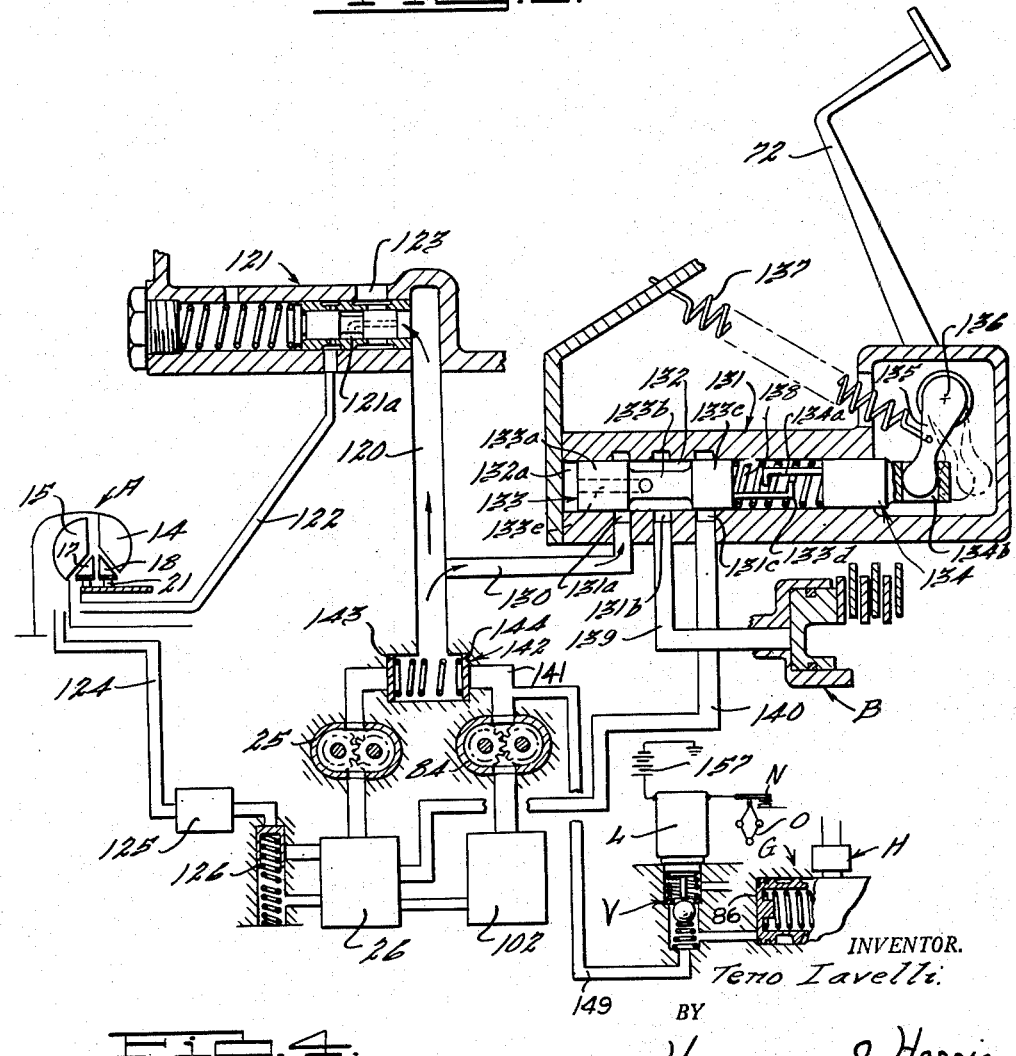
Fig. 4 is a diagrammatic view of the master clutch control system with certain parts thereof being shown in sectional elevation.

In the Fig. 4 arrangement, oil in sump 26 is adapted to be delivered by the engine driven pump 25 to the converter unit A and to the clutch unit B. Conduit 120 that connects the outlet of pump 25 to the converter A includes a pump pressure regulator valve 121 to control the pressure of the fluid delivered to the converter unit A and to the clutch B. The pressurized oil delivered to regulator valve 121, in excess of that transmitted to the converter A by conduit 122 and to clutch B by conduit 130, is returned to sump 26 through the pressure relief and spill port 123. Oil passing through the valve bore 121a and conduit 122 to the converter A is returned to the sump 26 by conduit 124 which has suitable fluid cooling means 125 and converter pressure control valving 126 arranged in series therewith.

Pressurized oil from the outlet of pump 25 is delivered by conduit 130 to the clutch pressure control valve 131. Control valve 131 includes a cylinder bore 132 that has a spool type valve 133 reciprocably mounted therein. Valve 133 has spaced lands 133a and 133c connected by a reduced neck portion 133b. Land 133c carries an axially extending hook 133d, the function of which will subsequently become apparent. An axially extending bore 133e pierces the land 133a and portions of neck 133b. Also mounted in the bore 132 of valve cylinder 131 is a reciprocable plunger element 134. The inwardly disposed end of plunger 134 has an axially extending hook element 134a that is adapted to engage the hook 133d of valve 133 to provide means for effecting direct movement to the right of the valve 133 by the plunger 134. Plunger 134 is formed with a slot 134b at its outwardly disposed end. A rotatable crank arm 135 has an end portion slidably mounted in the slot 134b such that rotation of crank arm 135 about its pivot arms 136 will effect reciprocation of the plunger 134 in bore 132. Crank arm 136 is connected to the clutch pedal 72 so that depression of clutch pedal 72 will cause counterclockwise rotation of the crank arm 135 and rearward or movement to the right of plunger 134. A tension spring 137 that extends between the crank arm 136 and a stationary anchor point urges the clutch pedal 72 to extended clutch engaged position and tends to rotate the crank arm 136 clockwise. A compression spring 138 extends between the inwardly disposed, opposed faces of valve land 133c and plunger element 134. When the pump or pumps associated with the clutch B are not operating and pressure fluid is not being delivered to the valve 131 through conduit 130 then the spring 137 urges plunger 134, spring 138 and valve 133 towards the left to completely uncover the pressure fluid inlet port 131a to valve bore 132. At this time clutch B will be disengaged even though the clutch pedal 72 will be in extended normally engaged position. Immediately on starting of the engine E and delivery of pressure fluid to conduit 130 by the pump 25, clutch B will be engaged for inlet and outlet ports 131a and 131b of valve 131 will be connected for the passage of pressure fluid to conduit 139 and clutch B. Also, with delivery of pressure fluid to the open inlet port 131a, that portion of the bore 132 between valve lands 133a and 133c will be filled with pressure fluid and the axially extending bore 133e through valve 133 will conduct pressure fluid to the left end of bore 132 and develop a force in the chamber 132a at the left end of bore 132 that tends to urge valve 133 to the right so as to close off inlet port 131a. Fluid pressure in chamber 132a will never be of sufficient strength to cause the valve land 133a to be shifted rightwardly to a position where it will completely close off the inlet port 131a. The springs 137 and 138 are of sufficient strength to prevent the closure of port 131a by the pump pressure applied to the chamber 132a at the left end of valve 133. Consequently, when engine E is operating or pressure fluid is in conduit 130 and the clutch pedal 72 is released, there is always an open passageway between conduit 130 and clutch B so as to apply pressure fluid to the clutch B to effect engagement thereof.

Whenever a manual shift is to be made in the transmission gear box C the clutch pedal 72 is depressed and this shifts plunger 134 to the right and gradually relieves the force exerted by the spring 138 on the right end of valve 133. Valve 133 starts to gradually shift to the right under the influence of the pressure in chamber 132a and this begins to close off the pressure fluid supply port 131a and the flow of pressure fluid to clutch B. At the same time, bleed port 131c begins to open to bleed the pressure fluid from clutch B. After a predetermined rightward shift of plunger 134 by clutch pedal depression, the hooks 133d and 134a engage and then plunger 134 is directly connected to the valve 133 so that subsequent rightward shift of plunger 134 on full clutch pedal depression pulls valve 133 to the right and closes off inlet port 131a while fully opening the clutch supply conduit 139 to the drain port 131c and sump return conduit 140. The arrangement disclosed provides a means for first gradually reducing the supply of pressure fluid to the clutch B and thereafter quickly dumping the pressure fluid in the clutch B to disengage clutch B and condition the drive train for a manual change in the speed ratio drive to be transmitted.

On release of the clutch pedal 72 to reestablish engagement of clutch B, the plunger 134 is shifted to the left and by way of the spring 138 it shifts the valve 133 towards the left. As shift of valve 133 to the left first closes the clutch dump port 131c and thereafter opens up the pressure fluid inlet port 131a, it will be found that the pressure fluid admitted to bore 132 and to chamber 132a provides a hydraulic means that combines with the compression spring 138 to gradually cushion the engagement of the clutch B. The valve unit 131 thus provides a feathering or cushioning action on clutch engagement that is extremely desirable in a clutch device of this type. As valve 133 is shifted towards the left by release of clutch pedal 72, it will be found that after the dump port 131c is closed then pressure fluid quickly enters the valve bore 132 and clutch B to condition the clutch B for engagement. However, as the pressure fluid in bore 132 is also admitted to chamber 132a at the left end of the bore 132, automatically a fluid pressure generated force is applied to the left end of valve land 133a that tends to urge the valve 133 towards the right and compress the spring 138. The valve 133 thus acts as a pressure regulator valve and equilibrium is established with the valve 133 cracked across inlet port 131a as shown in Fig. 4.

To provide for operation of the clutch B when the engine E is dead and a towed or pushed start is necessitated, the pressure fluid supply system for the conduits 120 and 130 have the rear output shaft driven pump 84 tied into the clutch pressure fluid supply system. Pump 84, which draws oil from the sump 102 of the gear box C and directs it by conduit 149 to the shift cylinder G, has a branch conduit 141 that connects to a valve unit 142 which has a pair of check valves 143 and 144 therein. Valve 143 controls the pump 25 and valve 144 controls pump 84. When pump 25 is not operating pump 84 will supply pressure fluid to conduits 120 and 130 for operation of the torque converter A and the clutch B.

In Fig. 5 is shown another form of the invention wherein the conventional clutch control pedal is completely eliminated and a manually or foot operable electrical switch operator 182 provided to control operation of the control system. In Fig. 5 those portions of the control system that are identical with similar portions of the Fig. 4 form of the invention carry the same reference numerals. In Fig. 5 the solenoid operated clutch control valve unit 185 has been substituted for the clutch pedal operated clutch control valve unit 131 of the Fig. 4 modification of this invention.

Clutch control valve unit 185 includes the reciprocable, solenoid actuated, plunger 186 that engages and operates the spool type valve 187. Valve 187 is reciprocably mounted in the valve bore 188 of the valve cylinder 189. Spool valve 187 is normally retained in a raised position such as that shown in Fig. 5 by virtue of the compression spring 190. At such a time, the solenoid 191 of valve unit 185 is not energized for switch contacts 183 are open. Under such conditions if pressurized fluid is being supplied to conduit 130 by either of the pumps 25 or 84 then this pressurized fluid passes through valve cylinder inlet port 189a and enters that portion of the valve bore 188 between the spaced lands 187a and 187c of valve 187. Pressurized fluid in this part of the valve bore 188 can pass through valve cylinder outlet bore 189c and enter conduit 139 that transmits the fluid to clutch B to cause engagement of the clutch. The clutch B will then be engaged whenever switch contacts 183 are open and pressurized fluid is contained in supply conduit 130.

Whenever it is desired to disengage the clutch B, as when effecting a manual change in the speed ratio drive transmitted by the transmission gear box C, then it is merely necessary to close switch contacts 183 by a depression of switch operator 182. Closing switch contacts 183 energizes solenoid 191 and extends plunger 186 downwardly so as to depress valve 187 to a position where valve land 187a closes the inlet bore 189a and cuts off the supply of pressurized fluid to bore 188. The depression of valve 187 by the plunger 186 also causes valve land 187c to uncover the clutch drain bore 189b so that pressure fluid in clutch B may return to sump 26 or 102 through the port 189c, valve bore 188 and drain bore 189b. The clutch B will obviously disengage when fluid is drained from line 139 through the valve bore 188 and the sump return bore 189b.

To provide a form of feathered or cushioned engagement for the clutch control system shown in Fig. 5 there is included between the control valve 185 and the clutch B a pressure fluid accumulator unit 192. The accumulator unit 192 is designed to provide for quick release of the pressure fluid in clutch B when valve 187 is depressed by the energization of solenoid unit 191 and to also feather or cushion the application of clutch B on de-energization of solenoid 191. Accumulator 192 comprises a cylinder 193 having a piston 193a reciprocably mounted within the bore 194 thereof, the piston 193a being supported by compression spring means 195. Also mounted in the bore 194 of cylinder 192 is a plate type valve assembly having a valve port 196 that is normally closed by a plate valve 197. A spring means or the like normally urges the valve 197 against its seat to close valve port 196.

Pressure fluid from the opened control valve unit 185 normally passes through the inlet port 192a from the supply conduit 139 and the pressure of the fluid is sufficient to overcome the force of the spring supporting the plate valve 198 so as to cause an opening of the spring closed plate valve 198 such that pressure fluid may pass into the chamber 194a. From chamber 194a the pressurized fluid passes through the restrictor orifice 199 into conduit 139a that leads to the clutch B. With pressurized fluid being forced through the chamber 192a, valve 198, and chamber 194a to conduit 139a, the plate valve 197 will remain seated and the pressurized fluid entering conduit 139a will be directed into the clutch B. At the same time, however, the pressurized fluid directed into conduit 139a enters branch conduit 139b and tends to fill the bore 194 of cylinder 193. Directing pressure fluid into the bore 194 applies a force to the head of piston 193a and compresses the spring 195. This filling of chamber 194 and actuation of piston 193a during clutch engagement provides a spring cushion that feathers, that is, causes a smooth gradual engagement of the clutch B.

When clutch B is disengaged by energization of control valve solenoid 191, the supply of pressure fluid to conduit 139 is cut off by the shifting of valve 187 to a depressed, closed position and the pressure drops in chamber 192a. The trapped pressure fluid in bore 194 that is acted upon by the spring actuated piston 193a then is able to depress plate valve 197 and this opens port 196 which permits fluid to drain from clutch B through conduits 139a, 139b, bore 194, port 196, chamber 192a, and conduit 139 back to the drain port 189b in the opened valve 185. At the same time that piston 193 causes valve 197 to open the depression of the plate valve 197 engages and depresses the stem 198a of valve 198 to unseat the valve 198. With valve 198 unseated and the pressure fluid supply line 139 shut off from the supply line 130 by valve 185 an increased return flow of fluid from clutch B to opened valve unit 185 occurs for a second clutch drain line is provided through the conduit 139a, restrictor orifice 199, chamber 194a, opened valve 198, and chamber 192a to conduit 139. Thus it will be seen that the pressure fluid accumulator unit 192 not only provides for a cushioned or feathered engagement of clutch B but also for quick disengagement of the clutch B.

The switch operator 182 may be a separate foot operated switch or a hand operated switch. The foot operated switch may be associated with the engine accelerator control pedal (not shown) to secure coordinated actuation therewith, if desired. If the switch 182 is hand operated it might be mounted on the gear shift control lever (not shown) for the transmission unit C so as to be conveniently located with respect to the operator's hand.

I claim:

1. In a clutch mechanism comprising a pressure fluid actuated clutch operator, a source of pressure fluid, and conduit means connecting said source of pressure fluid to said clutch operator, a valve unit connected to said conduit means to control the flow of pressure fluid therethrough to said operator comprising a cylinder bore, a valve reciprocably mounted in said bore, a plunger reciprocably mounted in said bore and spaced from said valve, resilient means extending between said valve and said plunger, means carried by and directly connectible between said valve and said plunger permitting relative movement therebetween to effect conjoint movement thereof after a predetermined relative movement therebetween, and driver operable means to effect reciprocable movement of said plunger in said bore, said valve unit including means whereby pressure fluid passing through said valve unit to said clutch operator on opening of said valve is applied to said valve in a manner so as to oppose opening movement of said valve by plunger impressed movement of said resilient means.

2. In a clutch mechanism adapted to drivingly connect driving and driven members including pressure fluid operated clutch engaging means, a source of pressure fluid, conduit means connecting said source of pressure fluid to said clutch engaging means, a valve unit connected to said conduit means between said source of pressure fluid and said clutch engaging means to control delivery of pressure fluid to the clutch engaging means, comprising a cylinder bore, pressure fluid inlet and outlet ports piercing said bore, a piston type valve reciprocably mounted in said bore to control the passage of pressure fluid therethrough, a plunger member reciprocably mounted in said bore spaced from said valve and movable relative thereto, compressible resilient means extending between said valve and said plunger adapted to transmit movement of said plunger to said valve in one direction, interengageable means carried by said valve and said plunger engageable to directly connect said valve and plunger member for conjoint movement in the opposite direction after a predetermined movement of said plunger in the opposite direction, and operator operable means to effect reciprocable movement of said plunger member.

3. In a clutch mechanism comprising a pressure fluid actuated clutch operator, a source of pressure fluid, and conduit means connecting said source of pressure fluid to said clutch operator, a valve unit connected to said conduit means to control the flow of pressure fluid to said clutch operator comprising a valve, resilient means to normally retain said valve in a first position so as to provide for clutch engagement, operator controlled solenoid actuated means to effect movement of said valve to a second position so as to provide for clutch disengagement, and a pressure fluid accumulator connected between said valve and said clutch operator adapted to restrict the supply of pressure fluid to said clutch operator to automatically cushion clutch engagement, said accumulator comprising a restrictor orifice and a chamber with a resiliently supported piston mounted therein.

4. In a clutch mechanism adapted to drivingly connect driving and driven members including pressure fluid operated clutch engaging means, a source of pressure fluid, and conduit means connecting said source of pressure fluid to said clutch engaging means, a valve unit connected to said conduit means between said source of pressure fluid and said clutch engaging means comprising a cylinder bore, pressure fluid inlet and outlet ports piercing said bore, a piston type valve reciprocably mounted in said bore to control the passage of pressure fluid therethrough, a driver operable plunger member reciprocably mounted in said bore and engageable with said valve to effect movement of said valve between clutch engaged and clutch disengaged positions, resilient means normally urging said valve to a clutch engaged position, and fluid pressure actuated, resiliently supported pressure fluid receiving means connected to said conduit means between said valve and said clutch engaging means to automatically cushion engagement of the clutch mechanism.

5. In a clutch mechanism adapted to drivingly connect driving and driven members including pressure fluid operated clutch engaging means, a source of pressure fluid driven by said driving and driven members, and conduit means connecting said source of pressure fluid to said clutch engaging means, a valve unit connected to said conduit means between said source of pressure fluid and said clutch engaging means comprising a cylinder bore, pressure fluid inlet and outlet ports piercing said bore, a piston type valve reciprocably mounted in said bore to control the passage of pressure fluid therethrough, a plunger member reciprocably mounted in said bore, and engageable with said valve to effect movement thereof between clutch engaged and clutch disengaged positions, means normally urging said valve to a clutch engaged position and pressure fluid operable means effective upon flow of pressure fluid through the valve to the clutch engaging means to retard the effect of the clutch engaging pressure fluid and thereby cushion clutch engagement.

6. A clutch mechanism including pressure fluid operated clutch engaging means, a source of pressure fluid driven by said driving and driven members, conduit means connecting said source of pressure fluid to said clutch engaging means, a valve unit connected to said conduit means between said source of pressure fluid and said clutch engaging means to control the delivery of clutch engaging pressure fluid to said clutch engaging means comprising a cylinder bore, pressure fluid inlet and outlet ports piercing said bore, a piston type valve reciprocably mounted in said bore, a plunger member reciprocably mounted in said bore, compressible resilient means extending between said valve and said plunger adapted to transmit movement of said plunger to said valve in a valve opening direction, rigid means carried by said valve and said plunger engageable to directly connect said valve and plunger member for conjoint movement in the valve closing direction after a predetermined movement of said plunger relative to said valve in the latter direction, and operator operable means to effect reciprocable movement of said plunger member.

7. A clutch mechanism comprising a pressure fluid actuated clutch operator, a source of pressure fluid, conduit means connecting said source of pressure fluid to said clutch operator, a valve unit connected to said conduit means to control the flow of pressure fluid therethrough to said clutch operator comprising a valve, resilient means to normally retain said valve in a first position so as to provide for clutch engagement, driver controlled solenoid actuated means to effect movement of said valve to a second position so as to provide for clutch disengagement, and a pressure fluid accumulator connected between said valve and said clutch operator adapted to restrict the supply of pressure fluid to said clutch operator and to temporarily absorb a part of the force clutch engaging pressure fluid to automatically cushion clutch engagement.

8. In a clutch mechanism adapted to drivingly connect driving and driven members including pressure fluid operated clutch engaging means, a source of pressure fluid, conduit means connecting said source of pressure fluid to said clutch engaging means, a valve unit connected to said conduit means between said source of pressure fluid and said clutch engaging means to control clutch engaging action comprising a cylinder bore, pressure fluid inlet and outlet ports piercing said bore, a piston type valve reciprocably mounted in said bore to control the passage of pressure fluid therethrough, a plunger member reciprocably mounted in said bore and spaced from said valve, compressible resilient means extending between said valve and said plunger adapted to transmit movement of said plunger to said valve in a valve opening direction, interengageable link means carried by said valve and said plunger engageable to directly connect said valve and plunger member for conjoint movement in a valve closing direction after a predetermined movement of said plunger in the valve closing direction, and operator operable means to effect reciprocable movement of said plunger member.

9. In a clutch mechanism adapted to drivingly connect driving and driven members including pressure fluid operated clutch engaging means, a source of pressure fluid, conduit means connecting said source of pressure fluid to said clutch engaging means, a valve unit connected to said conduit means between said source of pressure fluid and said clutch engaging means to control clutch engaging action comprising a cylinder bore, pressure fluid inlet and outlet ports piercing said bore, a piston type valve reciprocably mounted in said bore to control the passage of pressure fluid therethrough, a plunger member reciprocably mounted in said bore and spaced from said valve, compressible resilient means extending between said valve and said plunger adapted to transmit movement of said plunger to said valve in a valve opening direction, interengageable link means carried by said valve and said plunger engageable to directly connect said valve and plunger member for conjoint movement in a valve closing direction after a predetermined movement of said plunger in the valve closing direction, and operator operable means to effect reciprocable movement of said plunger member, said valve being arranged in said bore such that pressure fluid passing through said bore to effect engagement of said valve is applied to said valve so as to resist opening of said valve and thereby provide a pressure reducing action that produces a cushioned clutch engagement.

10. In a clutch mechanism adapted to drivingly connect driving and driven members including pressure fluid operated clutch engaging means, a source of pressure fluid, conduit means connecting said source of pressure fluid to said clutch engaging means, a valve unit connected to said conduit means between said source of pressure fluid and said clutch engaging means to control clutch engaging action comprising a cylinder bore, pressure fluid inlet and outlet ports piercing said bore, a piston type valve reciprocably mounted in said bore to control the passage of pressure fluid therethrough, a solenoid operated plunger member reciprocably mounted in said bore operable to urge said valve to closed position, resilient means continuously urging said valve to open position, driver operable means to control energization of the solenoid and valve opening movement of the plunger, and an accumulator chamber mounted in the conduit means between the valve unit and the clutch engaging means providing means to cushion engagement of the clutch.

11. A clutch mechanism including an operator operable element to control engagement and disengagement of the clutch, pressure fluid operated means to effect engagement of said clutch, and a pressure fluid control valve associated with said pressure fluid operated means and actuable by said operator operable element to control operation of said pressure fluid operated clutch engaging means, said control valve having a pressure fluid by-pass means extending through portions thereof and providing a pressure fluid control means to oppose opening movement of said valve in one direction and to automatically cushion the engagement of said clutch, and means directly connectible between said manually operable means and said control valve to cause movement of said valve in the oposite direction to effect disengagement of said clutch.

12. A clutch mechanism including a driver operable element to independently control engagement and disengagement of said clutch mechanism, pressure fluid operated means to effect engagement of said clutch mechanism, a source of pressure fluid, conduit means connected between said source of pressure fluid and said pressure fluid operated clutch engaging means, valve means associated with said conduit means to control the flow of the pressure fluid through the conduit means to thereby control the actuation of said pressure fluid operated clutch engaging means, and means actuable by said operator operable means to operate said valve means, said conduit means having a restriction orifice therein and a pressure fluid accumulator connected to said conduit means, said accumulator being arranged to bleed off and store a portion of the pressure fluid flowing through the restriction orifice to the clutch engaging means so as to automatically cushion the engagement of said clutch and also provide means to effect a quick disengagement of the clutch mechanism by utilization of accumulator stored pressure fluid to open a clutch pressure fluid drain valve for the clutch engaging means.

References Cited in the file of this patent

UNITED STATES PATENTS

| Number | Name | Date |
|---|---|---|
| 1,923,819 | Gillett | Aug. 22, 1933 |
| 1,979,488 | Perez | Nov. 6, 1934 |
| 2,087,643 | Gillett | July 20, 1937 |
| 2,181,711 | Sinclair | Nov. 28, 1939 |
| 2,191,669 | Kress | Feb. 27, 1940 |
| 2,193,487 | McCollum et al. | Mar. 12, 1940 |
| 2,256,960 | Neracher et al. | Sept. 23, 1941 |
| 2,301,957 | Lang | Nov. 17, 1942 |
| 2,337,748 | Gsching | Dec. 28, 1943 |
| 2,430,811 | Gardiner | Nov. 11, 1947 |
| 2,450,161 | Price | Sept. 28, 1948 |
| 2,452,647 | Gagen | Nov. 2, 1948 |
| 2,457,692 | La Brie | Dec. 28, 1948 |